Dec. 4, 1962 K. HEFEL ET AL 3,066,776
AUTOMATIC CLUTCH CONTROL SYSTEMS FOR MOTOR VEHICLES
Filed Aug. 11, 1959 4 Sheets-Sheet 1

Inventors,
KARL HEFEL,
HUBERT FREIHERR VON THÜNGEN
BY
ATTY

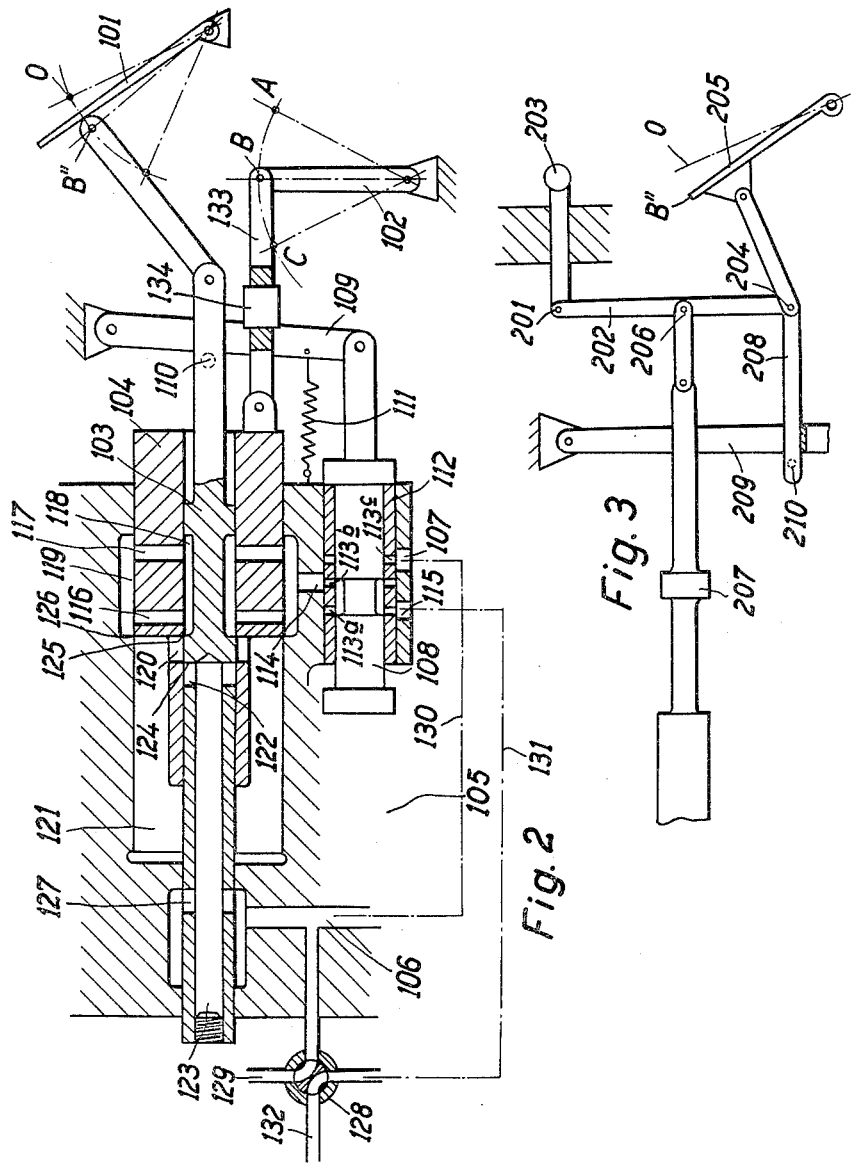

Dec. 4, 1962 K. HEFEL ET AL 3,066,776
AUTOMATIC CLUTCH CONTROL SYSTEMS FOR MOTOR VEHICLES
Filed Aug. 11, 1959 4 Sheets-Sheet 4

Inventors
KARL HEFEL,
HUBERT FREIHERR VON THÜNGEN
BY Albert W Zalkeind
ATTY

3,066,776
AUTOMATIC CLUTCH CONTROL SYSTEMS
FOR MOTOR VEHICLES
Karl Hefel, Schopfstrasse 27, Innsbruck, Austria, and Hubert Freiherr von Thüngen, Schmidstrasse 64, Friedrichshafen, Germany
Filed Aug. 11, 1959, Ser. No. 833,096
10 Claims. (Cl. 192—.075)

This invention relates to clutch controls, and more particularly to actuation of a clutch responsive to throttle or gas pedal position.

It is an object of the invention to provide a clutch actuation wherein the degree of actuation is automatically responsive to degree of movement of a foot-operated throttle pedal. It is another object of the invention to provide an arrangement wherein automatic actuation ceases after a vehicle has reached a predetermined speed. It is a further object of the invention to provide a clutch and throttle pedal coaction such that smooth starting of a vehicle from a stop position is achieved, and smooth transmission of torque via the clutch is effected regardless of changes in gas feed to the engine, so that motion of a vehicle is smoothly effected in performing various maneuvers such as parking, driving in processions or columns, and the like. It is a particular object of the invention to effect smooth transmission of torque when a vehicle changes from a moderate speed to a slower speed. It is yet another object of the invention to provide an arrangement wherein a simple adjustment can compensate for clutch wear and also wherein a simple adjustment can be made for predetermining the gas pedal position at which it is desired to engage the clutch.

Other objects and features of the invention will be apperent from the description which follows.

Other objects and features of the invention will be apparent from the description which follows:

Briefly our description comprises a compact servo control system arrangement of a fixed housing wherein a power piston is reciprocal and wherein a reciprocal valve control sleeve is disposed within the piston for effecting control of oil pressure on a face thereof. The valve sleeve is actuated by the vehicle gas pedal in such a manner that the pedal has a predetermined arc of movement for motor idling during the course of which the clutch is not actuated. Subsequent to such movement actuation of the clutch is effected by a tension spring which pulls a clutch lever into clutch engaging position. The construction is such that motion of the pedal releases pressure normally maintained on the piston, thereby permitting contraction of the spring, the extent of contraction depending on the degree of movement of the pedal.

A detailed description of the invention now follows in conjunction with the appended drawing in which:

FIG. 2 shows a modification of the invention;

FIG. 3 illustrates a further modification;

Figure 1:
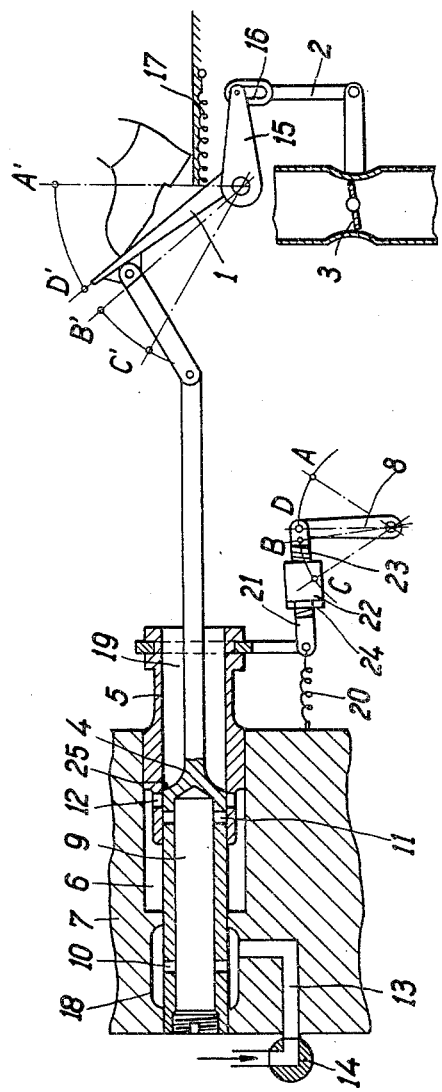
FIG. 1 is a cross-section of a valve sleeve and piston arrangement shown as articulated to a gas pedal for controlling a clutch operating bar or lever.

Referring now to FIG. 1, a conventional gas pedal 1, having a pivotal mount as shown, is illustrated which is articulated by means of a link as shown to the rod of a sleeve valve 4, the link being pivoted at its ends to the pedal and to the rod of the valve. Movement of the pedal rocks an arm 15 which connects to a link 2 through a slotted connection 16 to actuate a butterfly valve 3 for throttle control purposes. A return spring 17 maintains the pedal in full upward position as indicated by A'. Depression of the pedal serves to move valve sleeve 4 to the left. Sleeve valve 4 is closed at both ends, and controls pressure fluid from a valve plug 14 via a conduit 13 in housing 7, to move a hollow piston 5 to the right against the bias of a tension spring 20. The piston is connected by a linkage, comprising the link 21 and a wear compensating mechanism 22, to lever 8. It will be understood that the lever 8 is coupled in any conventional manner to operate a clutch. Spring 20 pulls lever 8 counterclockwise to engage the clutch when pressure on the piston is relieved by depression of the pedal 1, as will be described.

The valve sleeve 4 has a bore 9 communicating with ports 10 and 11 wherein the ports 10 communicate with annular recess 18 in housing 7 for feed of pressure fluid from conduit 13 into the bore 9. The ports 11 communicate with corresponding ports 12 in the piston body 5. Thus alignment of ports 11 and 12 can feed pressure fluid from bore 9 into the cylinder chamber 6 for exerting a force on piston 5 to move the piston toward the right against the tension of spring 20 which exerts a force, to the left, on the piston via a connecting bracket collar as shown.

The cylinder 5 has a smooth bore portion 19, the walls of which serve to cut off ports 11 from chamber 6 when the valve and piston are in the position shown in FIG. 1, ports 11 being to the left of ports 12. However, if the relative position of valve 4 and piston 5 were such that valve 4 had a position somewhat further to the left than as shown in FIG. 1, the ports 12 would be open to the bore portion 19 and thus fluid from chamber 6 could exhaust into the open end of the piston, relieving pressure on the piston. Such exhaust could be led back to a sump for re-pumping, by means not shown but of a conventional nature.

When the gas pedal is in uppermost position at A' the clutch operating lever 8 would be in the position A, the clutch being then fully disengaged, and being maintained in disengaged position by pressure in chamber 6 acting against the face of piston 5 which is exposed within the chamber and which pressure overcomes the spring 20. At that time, the ports 11 of the sleeve valve 4 are disposed to the left of the ports 12 in the piston 5, the sleeve valve 4 being moved to its extreme right-hand position and maintained there by action of the spring 17 which pulls the clutch pedal to the A' or top position. Ports 11 are always at the left of ports 12 although movement of valve 4 effects partial overlapping to permit pressure fluid to move into chamber 6 for actuating lever 8 toward position A. Thus, whenever pedal 1 moves from A' to D', clutch lever 8 moves from A to D, ports 11, however, always remaining leftwards of ports 12. If, however, the pedal be depressed beyond the idling period A'–D', gas starts to feed to the engine since valve 3 commences to open when the pedal is at D', and at the same time the valve sleeve 4 is being pushed further to the left. Due to the leftwards motion of valve 4, the ports 12 are uncovered so that there is fluid exhaust from chamber 6 via valve edge 25, into the portion 19 of the piston whereby fluid pressure on the piston is relieved. The spring 20 can then pull the piston, via the bracket collar connection, to the left. Thus the spring 20 serves to rock clutch lever 8 counter-clockwise to bring the clutch into transmission engagement, for example to the point B at which the clutch starts to engage. Engaging continues as pedal 1 continues to be depressed, but should motion of the pedal 1 cease at any time in its arc of movement whereby leftwards movement of valve 4 ceases, then the leftward movement of piston 5 will likewise cease, as will be apparent from the following. Spring 20 exerts a tension causing the piston to follow the valve as long as exhaust through the ports 12 takes place from chamber 6 to the portion 19 of the piston. When valve movement ceases, pressure is built up in chamber 6 (against which spring 20 cannot continue to contract) because the piston moves to the point shown in FIG. 1, cutting off ports 12 and locking the piston in position.

In the above-described arrangement the piston is a servo-motor which must follow the motion of the valve as controlled by the gas pedal. Thus the follow-up mechanism described utilizes resilient or spring power for engaging the clutch and the power of pressure fluid for holding the clutch in any degree of engagement under control of the gas pedal, depending on degree of depression thereof.

Continued movement downward of pedal 1 to the point C', whereat the clutch is fully engaged at C, occasions a follow-up movement as hereinabove described wherein the piston necessarily follows the valve as long as the ports 12 are uncovered due to leftwards movement of the valve 4 to exhaust fluid from chamber 6.

When the gas pedal is released, spring 17 pulls it back, closing throttle valve 3, and pulling sleeve valve 4 to the right. This motion of valve 4 aligns the ports 11 and 12 permitting pressure fluid to enter chamber 6 to force piston 5 to the right against the pull of spring 20. The action continues until valve 4 has reached its extreme right hand position at which time lever 8 is back to clutch open position at A, the pedal then being at A'.

The arrangement of the position of the gas pedal with respect to the clutch lever 8 is such that engine torque by virtue of gas feed to the engine will always be at least equal to or preferably larger than the torque being transmitted by the clutch, so as to prevent stalling. By means of such an arrangement, ease of operation of the vehicle is assured because the degree of engagement of the clutch is more than matched by the gas feed and the operator does not have the burden of having to control the relationship between the torque which the clutch is transmitting and the power that the engine is capable of putting out in order to prevent stalling. The operator merely presses the gas pedal down until such time as the vehicle begins to move.

After a vehicle is in motion the plug valve 14 may be turned to an off position either manually or by automatic means (hereinafter disclosed) to cut off fluid pressure clutch disengaging operation. With fluid pressure thus cut off, the clutch is disengaged by means of the usual clutch spring which is conventionally a part of the clutch.

With a device as hereinabove described, a driver has very precise control over a vehicle for starting, parking, and maneuvering, inasmuch as the speed of the vehicle is purely a function of the movement of the gas pedal, and even though the vehicle may be proceeding very slowly, there is no danger of stalling.

In order to compensate for wear of the clutch linings an adjusting device is utilized. Thus the portions 21 and 23 of the link intermediate the piston bracket and clutch control lever 8 are formed with left and right hand threads which engage in a left and right hand threaded nut 22. By rotating nut 22 the length 21—23 can be decreased to compensate for clutch lining wear. A jamb nut 24 is carried on link portion 21 to engage nut 22 for locking that nut in adjusted position.

In the form of invention shown in FIG. 2, a gas pedal 101 is disclosed which through a system operating primarily on the follow-up mechanism hereinabove described controls a clutch actuating lever 102. In this instance the gas pedal is connected to a control valve 103 which is slidable in a piston 104, the clutch lever 102 being connected to the piston through linkage 133 and wear take-up mechanism 134. Piston 104 is reciprocal in housing 105 and oil pressure may enter the housing through either of the channels 106 or 107. An additional control valve 108 is reciprocally carried in the housing which can be adjusted by means of a lever 109 and a pin 110 carried by sleeve valve 103. Lever 109 is biased to the left by means of a tension spring 111 as shown. A bushing 112 having ports 113a, b, and c is disposed intermediate valve 108 and housing 105. The ports 113a, b and c are for the purpose of establishing communication between inlet 107 and a bore 114 or between bore 114 and an outlet opening 115. Piston 104 has bores 116 and 117 which connect a recess 118 of valve 103 with an annular recess or chamber 119 cut into the housing. Recess 118 may be connected with a cylinder chamber 121 in the housing through ports 120.

Valve 103 has ports 122 through which chamber 121 can be connected with inlet 106 via the bore 123, for two-way movement of valve 103 and piston 104. Normally, in rest position, communication is cut off at the edges 124 and 125.

In the position in which the components are shown in FIG. 2 wherein the gas pedal is in the position B'' and the clutch lever is in the position B, it will be assumed that the clutch has just begun to engage. Should the driver release the pedal so that it will return to the idling position O, by means of a spring (not shown) the stop pin 110 in moving to the right will pull valve 108 to the right and thereby connect bore 114 with inlet 107 via bores 113b and c. At the same time movement of valve 103 to the right opens communication at edge 124 for pressure oil to pass into cylinder chamber 121 from inlet 106 via bore 123 and bores 120 and 122. This serves to force piston 104 to the right which opens chamber 121 to recess 119 at the edge 126. At this time oil pressure now passes through bores 107, 113b and 114, such pressure likewise acting on piston 104 to move lever 102 to the A position, that is, the clutch disengaged position.

Depressing the gas pedal to the position B'' causes pin 110 to release lever 109 and spring 111 pulls valve 108 to the left as shown in FIG. 2. This results in connecting piston chamber 121 with outlet 115 via bores 114 and 113b and 113a. Thus piston 104 is free to move under the action of a clutch spring which is assumed to be part of the conventional clutch controlled by lever 102, and which is not shown, the movement of piston 104 being toward the left until it reaches the postion wherein the chamber 121 is closed by virtue of closure at the edges 125 and 126 of the piston with reference to recess 118 and 119 respectively. At this time lever 102 is in position B, where the clutch has just begun to engage.

If the gas pedal is depressed beyond the point B'' valve 103 moves to open edge 125 and oil can exhaust from chamber 121 thus causing piston 104 to move further toward the left under the force of the clutch spring as hereinabove mentioned, until ultimately movement of the piston in following the valve 103 closes the edge 125. Should the gas pedal be released, the port 122 opens at edge 124 due to movement of valve 103 to the right and pressure oil then flows via 106, 123, 127, 122, 120 into chamber 121 and forces piston 104 and the clutch lever 102 back to clutch disengaged position. During the course of such movement from B'' to O of the gas pedal, the valve 108 is again shifted so that oil inlet 107 is again opened up via bores 113b, 113a and 114.

When the follow-up device described above is in operation the plug valve 128 is in the position shown. At that time pressure oil conduit 129 connects with inlet 106 which connection continues via pipe 130 with inlet 107. Outlet 115 connects via conduits 131 and 132 to an oil sump, not shown. If plug valve 128 be rotated, oil feed to inlet 106 can be shut off and thus the clutch would remain engaged in all positions of the gas pedal. In such case the clutch is separately operated by the driver since the gas pedal has no control thereover.

In the arrangement of FIG. 2, as the gas pedal starts to move beyond point B'', counterclockwise, clutch lever 102 moves automatically from B to A independently of the completion of movement of the pedal to O.

FIG. 3 shows an arrangement modifying the lever arrangement of FIGS. 1 and 2, wherein the operator may adjust the point at which the clutch either begins or ceases to engage relative to the position of the gas pedal. This effect can be achieved by means of a compound lever 202 having an end 201 which can be disposed at a predetermined position by means of a handle ball 203 at one end. The other end 204 of lever 202 is shifted by the gas pedal 205. The compound lever 202 has at some intermediate point 206 a pivotal connection via a link, as shown, with the sleeve valve 207. In this instance, the sleeve valve 207 functions as the valve 4 of FIG. 1 or as the valve 102 of FIG. 2.

By pulling upon the ball end 203 the lever 202 is given an adjusted position, which has the effect of depressing the gas pedal 205, and also pulling the valve 207 toward clutch closing position. Accordingly engagement of the clutch occurs at increased engine r.p.m.

A lever 209 is pivoted at some fixed part of the mechanism as its upper end and coacts with a pin 210 carried on a link 208, so that upward movement of the pedal rocks lever 209 to actuate a valve (not shown on FIG. 3) such as valve 108 of FIG. 2.

Figure 4:
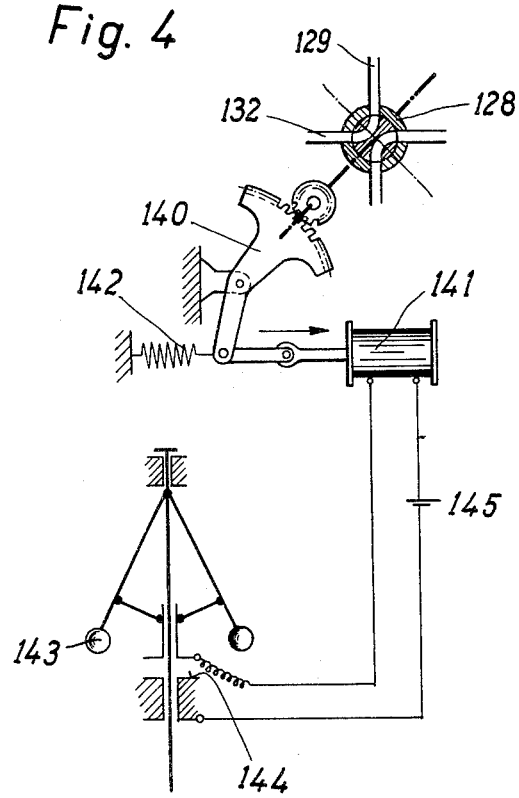
FIG. 4 shows a system for automatic operation responsive to vehicle speed of the clutch actuating system.

FIG. 4 shows diagrammatically how a plug valve such as 128 as used in the form of the invention shown in FIG. 2 may be shut off when the engine has reached a predetermined speed so the power operation of the clutch in coordination with the gas pedal ceases and the operator takes over control of the clutch pedal. The arrangement comprises the use of centrifugal governor 143 which will be understood to be driven by the vehicle engine. At a predetermined speed the governor operates in a well-known manner to open a contact at 144 for de-energizing an electromagnet 141 by cutting off current from a current source 145. In normal operation, with the clutch moving responsive to the gas pedal, the electromagnet 141 is energized and has a plunger, as shown, in position to maintain a gear segment 140 in the position illustrated. The gear segment engages a pinion, as shown, which will be understood to be coupled to the plug valve so that rotation of the pinion will effect rotation of the valve to close off communication therethrough. When the solenoid is deenergized a tension spring 142 rotates the gear segment to rotate the pinion for shutting off the plug valve.

Figure 5:
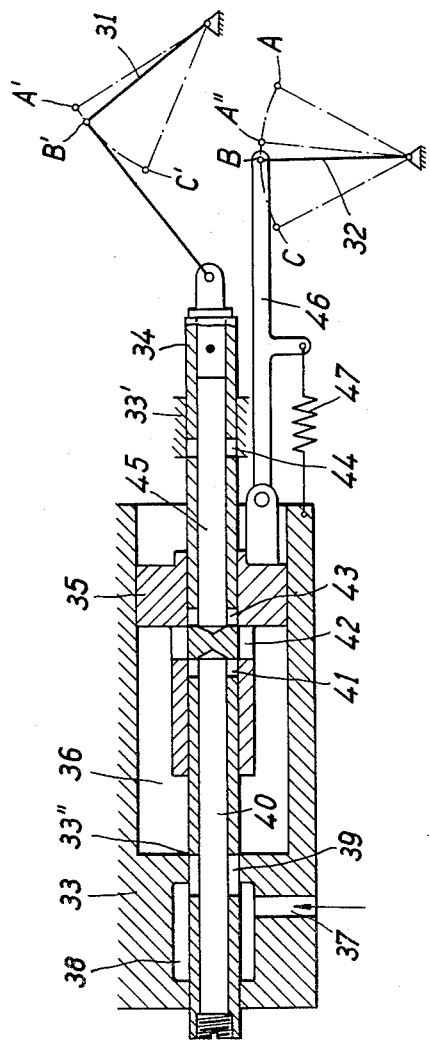
FIG. 5 illustrates a still further modification of the invention.

A particularly compact and simple form of the invention is shown in FIG. 5 wherein a gas pedal 31 is articulated through a link to a slide valve 34 and will be assumed to be in the position B' corresponding to the position B of a clutch actuating lever 32, wherein the position B' corresponds to a position whereat the throttle valve (not shown) is just about to open and whereat the clutch (not shown) is just about to open.

The clutch control lever 32 is articulated by means of a rod 46 to a piston 35 in housing 33, and as in previous forms of the invention the valve is slidable with respect to the piston and the housing may have an additional support portion 33' in which the valve has bearing support. A face of the piston is within the chamber 36 which forms the cylinder for oil pressure to act on the piston.

Oil inlet 37 feeds oil to an annular recess 38 which surrounds the valve body and may be machined out of the housing material or otherwise formed therein. It will be noted that the valve is closed at both ends as in previous modifications and also has a central closure as shown so that it comprises two hollow portions or bores 40 and 45. The bore 40 connects with ports 39 nd 41 while the bore 45 connects witah ports 43 and 44. The piston 35 has a projection extending into chamber 36 which is provided with ports 42. A tension spring 47 is connected between the housing and the projection on the link 46 for biasing control lever 32 into clutch engaging position.

In operation, assuming the parts to be in the position shown, if gas pedal 31 is depressed in the direction of C' the throttle valve (not shown) will be assumed to open in proportionate amount by an arrangement of the general configuration shown in FIG. 1 for the throttle valve control. At this time valve 34 moves toward the left and the ports 39 and 42 remain closed insofar as any communication between bore 40 and chamber 36 is concerned. However, ports 43 and 44 are open to chamber 36 so that exhaust oil can flow through bore 45 via 43, 45, 44 to a sump (not shown). At this time spring 47 can pull lever 32 counterclockwise thus moving piston 35 to the left. Movement of the piston closes the ports 43 and 44, thereby locking oil in chamber 36 and motion of lever 32 accordingly ceases somewhere between points B and C depending upon how far pedal 31 has been depressed.

On the other hand if the gas pedal is moved by its spring (not shown) upwardly toward point A', ports 42 will open and thus conduct pressure fluid into chamber 36. At this time ports 44 are closed by the walls of the bearing portion of the housing 33'. Pressure on piston 35 thus moves lever 32 to the A position or clutch disengaged position. Should the gas pedal be moved a small amount beyond the idling position, that is beyond B', ports 43 and 44 open to permit oil escape from chamber 36, under the pull of spring 47 on the piston, and thus piston 35 together with lever 32 moves quickly into the position shown, or possibly somewhat to the left of such position, dependent upon the position assumed by the gas pedal to the left of the point B'.

Having thus described our invention, we are aware that various modifications may be made without departing from the spirit thereof, and accordingly we do not seek to be limited to the precise illustrations herein given except as set forth in the following claims.

We claim:

1. In a fluid pressure operated clutch control system, a gas pedal and throttle valve connected thereto, a clutch actuating lever, and actuating means connected for reversible force actuation intermediate said pedal and lever for bidirectionally actuating said clutch lever in continuous follow-up response to movement of said pedal depending on direction of movement, said actuating means effecting a degree of movement of said clutch lever in either direction correlated predeterminedly with the degree of movement of said pedal for a predetermined portion of movement thereof, said actuating means comprising a bias element connected to move said clutch lever toward clutch engaged position, a pressure responsive piston connected to oppose said bias element and operable to move said clutch lever to clutch disengaged position, and control means operable by said pedal to control pressure fluid to actuate said piston and to exhaust said pressure fluid, wherein said piston is normally influenced by pressure thereon to maintain said disengaged position of said clutch lever, and wherein a throttle opening movement of said pedal is operative to relieve pressure on said piston, by exhausting pressure fluid, to permit said bias element to move said clutch lever toward clutch engaging position, said control means comprising a valve movable by said pedal, said valve and piston having respective port means registrable with each other in predetermined positions of said valve and piston to feed pressure fluid to said piston in one position, and to exhaust said pressure fluid in another position, wherein movement of said valve is followed by movement of said piston by virtue of said bias element acting thereon, and means for connecting said system to a source of fluid pressure.

2. In a system as set forth in claim 1, said piston being tubular, said valve being tubular and reciprocally carried within said piston, a pressure chamber, said piston having an end in said pressure chamber and reciprocal therein, said valve having a closed end within said piston, an exhaust outlet means, said port means comprising an aperture through the tubular wall of said valve registrable with an aperture through the tubular wall of said piston, said piston aperture effecting communication between said pressure chamber and said exhaust outlet means when said closed end of said valve is in a predetermined position with respect to said piston aperture.

3. In a clutch control system, a gas pedal, a clutch actuating lever, and actuating means connected for reversible force actuation intermediate said pedal and lever for bi-directionally actuating said clutch lever in response to movement of said pedal depending on direction of movement thereof, said means effecting a degree of movement of said clutch lever in either direction correlated predeterminedly with the degree of movement of said pedal for a predetermined portion of movement thereof, said means comprising a bias element connected to move said clutch lever toward clutch engaged position; a pressure responsive piston connected to oppose said bias element and operable to move said clutch lever to clutch disengaged position, and control means operable by said pedal to control pressure fluid to actuate said piston, and to exhaust said pressure fluid, wherein said piston is normally influenced by pressure thereon to maintain said disengaged position of said clutch lever, and wherein a throttle opening movement of said pedal is operative to relieve pressure on said piston, by exhausting pressure fluid, to permit said bias element to move said clutch lever toward clutch engaging position, including a throttle valve connected to said pedal for actuation thereby, and adjustable lever means for relating degree of engaging movement of said clutch lever with degree of opening of said throttle valve, and means for connecting said system to a source of fluid pressure.

4. In a clutch control system, a gas pedal, a clutch actuating lever, and actuating means connected for reversible force actuation intermediate said pedal and lever for bi-directionally actuating said clutch lever in response to movement of said pedal depending on direction of movement thereof, said means effecting a degree of movement of said clutch lever in either direction correlated predeterminedly with the degree of movement of said pedal for a predetermined portion of movement thereof, said means comprising a bias element connected to move said clutch lever toward clutch engaged position; a pressure responsive piston connected to oppose said bias element and operable to move said clutch lever to clutch disengaged position, and control means operable by said pedal to control pressure fluid to actuate said piston, and to exhaust said pressure fluid, wherein said piston is normally influenced by pressure thereon to maintain said disengaged position of said clutch lever, and wherein a throttle opening movement of said pedal is operative to relieve pressure on said piston, by exhausting pressure fluid, to permit said bias element to move said clutch lever toward clutch engaging position, including means responsive to engine speed to cut off fluid pressure to said piston.

5. In a fluid pressure operated clutch control system, a gas pedal and throttle valve connected thereto, a clutch actuating lever, and actuating means connected for reversible force actuation intermediate said pedal and lever for bidirectionally actuating said clutch lever in continuous proportional follow-up response to movement of said pedal, said actuating means comprising a valve and piston having coacting alignable ports maintained closely disposed, wherein said valve effects by its relative position with respect to said piston a continuous pressure on said piston when said ports are aligned to move said piston under pressure progressively with movement of said valve to move said clutch actuating lever in disengaging direction, means for effecting exhaust of the pressure acting on said piston when said valve is moved to effect non-alignment of said ports, said actuating means further comprising resilient bias means for effecting reverse movement of said piston to follow said valve as said valve moves in the direction to effect non-alignment of said ports whereby said piston continuously follows said valve in said latter direction to move said clutch lever in a direction of clutch engagement, and means for connecting said system to a source of fluid pressure.

6. In a system as set forth in claim 5, and pressure relief means comprising elements having relative motion with respect to each other for blocking pressure relief of said piston during final return movement of said pedal through a predetermined extent of engine idling, whereby pressure is maintained on said piston, independently of said final pedal movement, to move said clutch lever to fully disengaging position, said elements being disposed to relieve pressure from said piston after initial movement of said pedal through said predetermined extent of engine idling.

7. In a clutch control system, a gas pedal, a clutch actuating lever, and means connected intermediate said pedal and lever for actuating said clutch lever in response to movement of said pedal, said means effecting the degree of actuation of said clutch lever correlated with the degree of actuation of said pedal for a predetermined portion of movement thereof, said means comprising a bias element connected to move said clutch lever toward clutch engaged position; a pressure responsive piston connected to oppose said bias element and operable to move said clutch lever to clutch disengaged position, and control means operable by said pedal to control pressure fluid to actuate said piston, and to exhaust said pressure fluid, wherein said piston is normally influenced by pressure thereon to maintain said disengaged position of said clutch lever, and wherein a throttle opening movement of said pedal is operative to relieve pressure on said piston, by exhausting pressure fluid, to permit said bias element to move said clutch lever toward clutch engaging position, said control means comprising a valve movable by said pedal, said valve and piston having respective port means registrable with each other in predetermined positions of said valve and piston to feed pressure fluid to said piston in one position, and to exhaust said pressure fluid in another position, wherein movement of said valve is followed by movement of said piston by virtue of said bias element acting thereon, said valve having a tubular body and having closed ends, said piston having a bore, said valve being reciprocal within said bore, a housing comprising a pressure chamber, said piston being reciprocal within said pressure chamber, said piston having a tubular extension, said port means comprising apertures through a portion of the circumference of said tubular extension and through said valve, and additional apertures through said valve adjacent the ends thereof and said housing having respective walls co-acting therewith to control inlet pressure flow therethrough adjacent one end and exhaust flow adjacent the other end, and means for connecting said system to a source of fluid pressure.

8. In a fluid pressure operated clutch control system for a vehicle having an engine, a gas pedal, a clutch actuating lever, servo control means responsive to movement of said gas pedal connected intermediate said pedal and lever for actuating said clutch lever in response to movement of said pedal, said means effecting the degree of actuation of said clutch lever correlated with the degree of actuation of said pedal for a predetermined portion of movement thereof, and means to neutralize said servo control means at a predetermined engine speed.

9. In a fluid pressure operated clutch control system, a fuel control pedal and a fuel control device connected thereto and actuatable thereby, a clutch actuating lever, and actuating means connected for reversible force actuation intermediate said pedal and lever for bi-directionally actuating said clutch lever in continuous response to movement of said pedal depending on direction of movement thereof, said means comprising a valve operable by said pedal and a piston connected to said clutch lever, said valve and piston having respective ports movable into alignment and out of alignment depending on direction of movement of said pedal, for effecting pressure or exhaust at the face of said piston, and exhaust means disposed for communicating through the port of said piston with the face of said piston, said means effecting a degree of movement of said clutch lever in either direction correlated predeterminedly with the degree of movement of said pedal for a predetermined portion of movement thereof, and means for connecting said system to a source of fluid pressure.

10. In a clutch control system for a vehicle having an engine, a fuel control pedal, a clutch actuating lever, servo control means responsive to movement of said pedal connected intermediate said pedal and lever for actuating said clutch lever continuously in response to movement of said pedal, said means effecting the degree of actuation of said clutch lever correlated with the degree of actuation of said pedal for a predetermined portion of movement thereof, said means comprising a valve operable by said pedal and a piston connected to said clutch lever, said valve and piston having respective ports movable into alignment and out of alignment depending on direction of movement of said pedal, for effecting pressure or exhaust at the face of said piston, and exhaust means disposed for communicating through the port of said piston with the face of said piston, and means to neutralize said servo control means at a predetermined engine speed.

References Cited in the file of this patent
UNITED STATES PATENTS

| | | |
|---|---|---|
| Re. 20,792 | Gillett | July 12, 1938 |
| 1,729,173 | Marfaing | Sept. 24, 1929 |
| 2,163,903 | Whittington | June 28, 1939 |
| 2,180,537 | McCollum et al. | Nov. 21, 1939 |
| 2,365,470 | Ingres | Dec. 19, 1944 |
| 2,510,042 | Thomas | May 30, 1950 |